UNITED STATES PATENT OFFICE.

CHARLES G. WIBORG, OF GALESBURG, ILLINOIS.

METHOD OF WELDING.

SPECIFICATION forming part of Letters Patent No. 654,819, dated July 31, 1900.

Application filed January 5, 1900. Serial No. 436. (No specimens.)

*To all whom it may concern:*

Be it known that I, CHARLES G. WIBORG, a citizen of the United States, residing at Galesburg, in the county of Knox and State of Illinois, have invented certain new and useful Improvements in Methods of Welding, of which the following is a specification.

My invention relates to welding of metals, and particularly to welding copper to copper or to iron, steel, nickel, silver, or brass, although it may be employed equally well in the welding of various other metals.

To enable others skilled in the art to which my invention pertains to practice my process, I shall now proceed to describe the same.

In carrying out my invention I first thoroughly clean the surfaces of the pieces of metal to be welded in any preferred manner, after which the pieces are placed in contact with each other in the desired positions and bound together by small wires. The portions which are to be exposed to the heat are then coated with some refractory material in the form of a paste. I have found a paste of clay or of fire-clay or of asbestos mixed with sodium silicate to be best for the purpose, although any other suitable refractory substances may be employed, if desired. The pieces thus bound together and coated are then subjected to heat, the proper temperature being judged by the appearance of the cement envelop. If the work is heated gradually, the welding will usually be completed when a white heat has been attained. The purpose of the refractory coating or envelop is to hold the pieces of metal together, so that they may be turned or shifted in the fire to facilitate uniform heating and to prevent the pieces of metal shifting their positions relatively to each other and also to protect the metals and prevent the formation of scale and the access of air to the joint or joints. Upon removal from the fire the work is permitted to cool, after which the coating is broken off and the binding-wires filed away. The welded pieces may be annealed and further worked or worked without annealing or used in any other desired manner. In some instances where the work is quite small it will be understood that the binding-wires may be omitted, the refractory coating serving to keep the parts in their proper positions during the welding operation.

Various other modifications may be resorted to without departing from the spirit of the invention or sacrificing any of its advantages.

I claim—

1. The method of welding, which consists in placing the pieces of metal to be welded together, inclosing and holding together the portions of the same exposed to the heat by a refractory coating, and subjecting the whole to a welding heat.

2. The method of welding, which consists in placing the pieces of metal to be welded in contact with each other, binding them together by suitable binding-wires, inclosing the portions of the pieces exposed to the heat and the binding-wires by a refractory coating, and subjecting the whole to a welding heat.

3. The method of welding metals which consists in placing the pieces of metal to be welded together, inclosing and holding together the portions of the same exposed to the heat by a coating composed of a mixture of refractory material and sodium silicate, and subjecting the whole to a welding heat.

4. The method of welding, which consists in placing the pieces of metal together, completely inclosing the same by a refractory coating or envelop, and subjecting the whole to a welding heat.

In testimony whereof I affix my signature in presence of two witnesses.

CHARLES G. WIBORG.

Witnesses:
CHARLES E. JOHNSON,
CHARLES B. THWING.